United States Patent Office

3,478,089
Patented Nov. 11, 1969

3,478,089
LIQUID CARBOXYLIC ACID SALTS OF DIAMINES AS CURING AGENTS
Junji Ogura, Minoo, Noritoshi Mise, Ikeda, Makoto Yokoo, Toyonaka, and Yoshihiro Hatanaka, Osaka, Japan, assignors to Takeda Chemical Industries, Ltd., Higashi-ku, Osaka, Japan
No Drawing. Filed May 1, 1967, Ser. No. 634,883
Claims priority, application Japan, May 6, 1966, 41/28,816
Int. Cl. C07c *87/58;* C08g *51/84*
U.S. Cl. 260—501.2             1 Claim

ABSTRACT OF THE DISCLOSURE

Isocyanate component is cured at room temperature by using, as a curing agent, di-lactate of 4,4′-methylene-bis-(2-chloroaniline).

---

This invention relates to a method for curing isocyanate component and to a curing agent therefor. More concretely stated, the invention concerns the method for curing isocyanate component at room temperature employing as a curing agent, carboxylic acid salt of hexamethylene diamine or aromatic diamines, the salt being a liquid below 35° C.

Recently, polyurethanes have gained a variety of application fields, but there still remains room for improvement. For example, although polyurethane elastomer has been widely applied to various kinds of technical field due to its excellent properties such as remarkable abrasion resistance, tensile strength, elasticity, tear strength, and high resistance to oxygen, alkali and acid, etc., there is a difficulty connecting to curing agents for them. The most typical curing agent for producing polyurethane elastomers are polyols, diamines and water. However, when polyols or water are used as curing agent, the curing proceeds very slowly except when accelerated by heating or by addition of accelerator, and furthermore the resulting product is not so hard as the one obtained when using diamines as curing agent. While, when lower aliphatic diamines such as ethylene diamine are used, the curing reaction is so fast that they do not appear to be of practical significance. And when other higher aliphatic diamines or aromatic diamines, which have been commonly used as curing agents, are employed, heating at a rather high temperature, for example higher than 100° C., is necessarily required for conducting the curing process, and, further, the pot-life is also very short.

Therefore, these hitherto-known techniques for curing cannot effectively be applied to applications such as coating or lining of floor, wall, plants of chemical industry, sealing or caulking applications, etc.

According to the present invention, it is found that by the use of carboxylic acid salts of hexamethylene diamine or aromatic diamines, which salts are in a liquid state below 35° C., polyisocyanate component can be moderately cured at room temperature, to give a cured product having the characteristics of diamine curing.

It is an object of the present invention to provide a novel curing method of isocyanate component, which comprises allowing a carboxylic acid salt of hexamethylene diamine or aromatic diamine which is liquid at below 35° C. to act upon isocyanate component at about room temperature.

Another object of the present invention is to provide a novel curing method of isocyanate component, which is advantageously applicable to such a field as coating or lining of floor, wall, plants of chemical industries, etc., sealing or caulking applications.

Further objects of this invention are to provide novel salts of hexamethylene diamine or aromatic diamine, which salts are liquid below 35° C. and may be employed as a curing agent applicable at room temperature for isocyanate component.

Other objects will become apparent from the detailed descriptions hereinafter provided.

The curing agents of the present invention are selected from carboxylic acid salts of hexamethylene diamine or aromatic diamines which are in a liquid state below 35° C., the diamines being such as 4,4′-methylene-bis-(2-chloroaniline), tolylenediamine, etc., and the carboxylic acid to form the salt with the diamine, being such as maleic acid, lactic acid, acrylic acid, adipic acid, etc. As the carboxylic acid, such may also be employable as carboxylic acid esters having at least one carboxyl radical, which may be prepared from polycarboxylic acid and polyetherpolyol. Preferable carboxylic acid salt of hexamethylene diamine or an aromatic diamine, which salt is in a liquid state below 35° C., desirably below 25° C., may be exemplified by mono- or di-lactate of 4,4′-methylene-bis-(2-chloroaniline), diacrylate of 4,4′-methylene-bis-(2-chloroaniline), mono- or di-maleate of 4,4′-methylene-bis-(2-chloroaniline), dilactate of hexamethylenediamine, mono- or di-maleate of tolylenediamine, a salt of 4,4′-methylene-bis-(2-chloroaniline) and monocarboxylic acid monoester prepared from maleic acid and polypropyleneoxide (molecular weight, about 300–3000). In these salts, a ratio of amino radical of diamines and carboxyl radical of carboxylic acid is not necessarily strictly 1:1, but such may be employed as produced by a reaction between a carboxylic acid and a diamine in an optional ratio of carbonyl radical relative to amine, so far as it is in a liquid state below 35° C.

These salts may be prepared by a conventional manner, and a preferable one is as follows: In a solution of 13 kg. of 4,4′-methylene-bis-(2-chloroaniline) in 14 kg. of acetone is further dissolved in 9 kg. of lactic acid under stirring. The resultant solution is subjected to distillation to remove acetone to give 22 kg. of di-lactate of 4,4′-methylene-bis-(2-chloroaniline) as deep red-brown. Density: 1.3 (25° C.). Viscosity: about 200,000 centipoises.

All of the other salts employed in the present invention may be prepared in a similar manner to the above.

The carboxylic acid salt of the diamine employable in the present invention is not necessarily in a purified state, but there may be also effectively used, for example, a reaction mixture of the carboxylic acid and the diamine as it is without being subjected to purification process, or a product prepared by merely removing an excess reaction solvent from a whole reaction mixture of the carboxylic and the diamine. From practical viewpoint, the carboxylic acid salt of the diamine is desired to be of such a nature as is liquid even at 10° C., more preferably, at a temperature as low as 0° C.

These curing agents may be employed singly or in combination of two or more of them or with any other curing agent such as polyol, etc.

The isocyanate component to which the present invention is applicable may be exemplified by diisocyanates (e.g. aromatic diisocyanates) such as tolylene diisocyanate, ω,ω′-diisocyanate dimethyl benzene, diphenylmethane diisocyanate, naphthalene diisocyanate, etc., or aliphatic diisocyanates such as hexamethylene diisocyanate, tetramethylene diisocyanate, etc. or so-called polyisocyanate-polyol prepolymer having terminal isocyanate radical, which is prepared by the reaction an excess amount of the diisocyanates mentioned above and the conventional low molecular polyol (e.g. glycerine, trimethylol propane, hexanetriol, ethylene glycol, propylene glycol, diethylene glycol, sorbitol, mannitol, sucrose, etc.), polyesterpolyol which is prepared by a reaction between polycarboxylic acid and glycol, polyetherpolyol which may be prepared by addition polymerization of alkylene oxide to the low molecular polyol as mentioned above, or caster oil. Furthermore, the isocyanate component may involve, if necessary, additive components, for example, a blowing agent, foam stabilizer (e.g. silicon oil, surfactant), paints, reinforcing material, pigment, dye, antioxidant, fire-proofing agent, filler, etc.

The curing process of the present invention may proceed by mixing in a conventional manner at room temperature an isocyanate component and the carboxylic acid salt of hexamethylenediamine or an aromatic diamine,, and, if necessary, together with one or more of other components, for example, a blowing agent, foam stabilizer (e.g. silicone oil, surfactant), paints, reinforcing material, pigment, dye, antioxidant, fire-proofing agent, filler and other additives. The pot life of the mixture may be varied widely, for example 3 minutes to 24 hours by the combination of the isocyanate component with the carboxylic acid salt of a diamine or by changing the amount of the carboxylic acid salt to be added.

The mixture is easily cured at room temperature to give cured hard product usually in several hours after its application. But the curing time, if desired, may be shortened by heating. Anyhow, it is desirable that the mixture is kept standing for several days at room temperature to complete the curing.

The present curing method is applicable to coating, molding, sealing or cauking etc., especially cold setting applications.

For example, the mixture of the isocyanate component and the carboxylic acid salts of hexamethylenediamine or aromatic diamines, and, if desired, other additives, is, within its pot-life, poured into suitable mould, or coated on a floor, wall or a surface of apparatus, etc., or sealed or caulked into a suitable object, followed by keeping standing at room temperature.

It is to be understood that the following examples are solely for the purpose of illustration and not to be construed as limitations of this invention, and that many variations may be resorted to without departing from the spirit and scope of this invention. In examples, "g.", "kg.", "cm." and "mm." are "gram", "kilogram", "centimeter" and "millimeter" respectively. Temperature are all uncorrected, and percentage are all on the weight basis.

EXAMPLE 1

Polyoxypropylene glycol (molecular weight; about 1000) is allowed to react with tolylene diisocyanate (a mixture of 80% of 2,4-tolylene diisocyanate and 20% of 2,6-tolylene diisocyanate) in a molar ratio of NCO/OH of about 2, to obtain 100 weight parts of polyisocyanate prepolymer (amine equivalent: 720). With the prepolymer is admixed 20 weight parts of di-lactate of 4,4'-methylene - bis - (2 - chloroaniline), and the mixture is poured into the frame of 2 mm. height placed on a glass plate. So applied mixture losses its fluidity after 10 minutes and then is gradually hardened with foaming. After standing for several hours at room temperature, a non-tacky hard cured product is obtained. Thus obtained cured product is kept standing for 10 days at 25° C. under 50% relative humidity and then measured its physical properties; density: about 0.5, tensile strength: 30 kg./cm.$^2$ and elongation: 300%.

EXAMPLE 2

With 100 weight parts of the prepolymer prepared in the same manner as in Example 1, are admixed 20 weight parts of di-lactate of 4,4'-methylene-bis-(2-chloroaniline) and 3 weight parts of strontium hydroxide at room temperature, and the mixture is poured into the frame of 2 mm. height placed on the glass plate. So applied mixture loses its fluidity after 5 minutes, and then hardened after 20 minutes. The hardened product is kept standing for 6 days at 25° C. under 50% relative humidity, and then measured its physical properties; hardness (Shore A): 70, tensile strength: 100 kg./cm.$^2$ and elongation: 400%.

EXAMPLE 3

With 100 weight parts of the prepolymer prepared in the same manner as in Example 1, is admixed 19.2 weight parts of dilactate of hexamethylene diamine at room temperature. Thus obtained mixture can be stored for more than 24 hours in a liquid state. The mixture is poured into a frame of 2 mm. height placed on a glass plate. After 3 days, so applied mixture is hardened. The hardened product is allowed to stand for further 2 weeks at 25° C., followed by measuring its physical properties; hardness (Shore A): 23; tensile strength: 7 kg./cm.$^2$ and elongation: 500%.

EXAMPLE 4

With 100 weight parts of the prepolymer prepared in the same manner as in Example 1, is admixed 9.6 weight parts of di-lactate of hexamethylene diamine at room temperature. Thus obtained mixture can be stored for more than 24 hours in a liquid state. The mixture is poured into the frame of 2 mm. height placed on a glass plate. After 3 days, the mixture is hardened, and the hardened product is allowed to stand for further 2 weeks, followed by measuring its physical properties; density; 0.6, tensile strength: 3.5 kg./cm.$^2$ and elongation: higher than 800%.

EXAMPLE 5

One mol of polyoxypropylenetriol (molecular weight; about 3000) is reacted with 3 mol of tolylene diisocyanate (a mixture of 80% of 2,4-isomer and 20% of 2,6-isomer) to obtain a prepolymer of amine equivalent of 1200. With 100 parts of the prepolymer is admixed 20 weight parts of dilactate of 4,4'-methylene-bis-(2-chloroaniline) at room temperature. There occurs a gelatin of the mixture after 40 minutes—one hour at room temperature. A hardened product produced by keeping standing the mixture for 6 days at room temperature has the following characteristics; hardness (Shore A): 63, tensile strength: 44 kg./cm.$^2$ and elongation: 160%.

EXAMPLE 6

With 100 weight parts of the prepolymer prepared in the same manner as in Example 1, are admixed 15 weight parts of dilactate of 4,4'-methylene-bis-(2-chloroaniline) and 2 weight parts of diethylene glycol at room temperature. The mixture begins to be cured with an occurrence of gelation after about 20 minutes and then hardened gradually. A hardened product obtained by keeping standing for 6 days at room temperature, has the following characteristics; hardness (Shore A): 55, tensile strength: 50 kg./cm.$^2$ and elongation: 350%.

EXAMPLE 7

Polyoxypropylene triol (molecular weight; about 3000) is allowed to react with tolylene diisocyanate (a mixture of 80% of 2,4-isomer and 20% of 2,6-isomer) in a molar ratio of NCO/OH=2, to obtain polyisocyanate prepolymer (amine equivalent :1200). 100 weight parts of the prepolymer is mixed with 80 weight parts of talc and 3 weight parts of supermicroscopic silica ("Airosil"; trade name of Degussa Co., Germany) by a kneader to obtain a compound. To 100 weight parts of the compound is admixed 10 weight parts of dilactate of 4,4'-methylene-bis-(2-chloroaniline), and the mixture is applied uniformly on a floor of cement-mortar. After 5 hours, so applied mixture is hardened to give the floor-coating having good elasticity and good touch.

Alternatively, the above-mentioned compound is hardened in the same manner as in Example 1 to give a hardened sheet which has the following characteristics;

|  | Hardened sheet | Control (vinyl-asbestos tile) |
|---|---|---|
| Tensile strength (kg./cm.$^2$) | 40 | 10 |
| Elongation at break, (percent) | 200 | 30 |
| Abrasion resistance (Taber type CS-17 wheel) (g. lost/1,000 cycles) | 0.42 | 0.61 |
| Alkali resistance (1% NaOH, 25° C., 1 week dip) | Unchanged | Unchanged |
| Acid resistance (5% H$_2$SO$_4$, 25° C., 1 week dip) | [1] 3.7 | [1] 27.9 |

[1] Percent weight increase.

The control (vinylasbestos tile) is extremely hydrophobic and, therefore, when coated on the floor, it is inclined to make moisture stagnate between the floor and coated sheet, while the hardened sheet of this example has no such defect at all, since it has an ability to take-up and discharge moisture.

EXAMPLE 8

With 100 weight parts of prepolymer prepared in the same manner as in Example 5, is admixed 10 weight parts of di-lactate of hexamethylene diamine at room temperature. Thus obtained mixture can be stored for longer than 24 hours in a liquid state. The mixture is poured into the frame of 2 mm. weight placed on a glass plate and kept standing at room temperature. It is hardened after 3 days and then kept standing for further 2 weeks, followed by measuring its physical properties. The result is as follows; hardness (Shore A): 40, tensile strength: 7 kg./cm.$^2$ and elongation: 180%.

EXAMPLE 9

With 100 weight parts of the prepolymer prepared by the same manner as in Example 1, is admixed 73 weight parts of a salt of 4,4'-methylene-bis-(2-chloroaniline) with monocarboxylic acid monoester prepared from maleic acid and polypropylene glycol (molecular weight; about 300). The mixture is poured into the frame of 2 mm. height placed on a glass plate. The applied mixture is gelled after about 35 minutes and further kept standing for 6 days at room temperature, followed by measuring its physical properties. The result is as follows; hardness (Shore A): 60, tensile strength: 45 kg./cm.$^2$, elongation: 300% and no foam is found in the product.

EXAMPLE 10

With 100 weight parts of the prepolymer prepared by the same manner as in Example 1, is admixed 25 weight parts of monolactate of 4,4'-methylene-bis-(2-chloroaniline). The resultant mixture is poured into the frame of 2 mm. height placed on the glass plate. The applied mixture loss its fluidity and is hardened gradually. After kept standing for several hours at room temperature, the non-tacky hardened product is obtained. The hardened product is kept standing for further 10 days at 25° C. under 50% relative humidity to give the completely cured product having the following characteristics; hardness (Shore A): 80, tensile strength: 40 kg./cm.$^2$ and elongation: 200%.

EXAMPLE 11

In the manner described in Example 9 a salt prepared from 1 mole of 4,4'-methylene-bis-(2-chloroaniline) and 2 moles of maleic monoester of polyoxypropylene glycol (molecular weight: about 300) is used instead of a salt of 4,4'-methylene-bis-(2-chloroaniline) with mono-maleic monoester of polyproylene glycol to give the cured product having the following characteristics: tensile strength: 10 kg./cm.$^2$, hardness (Shore A): 60 and elongation: 300%.

EXAMPLE 12

With 100 weight parts of prepolymer prepared in the same manner as in Example 1, is admixed at room temperature 16.5 weight parts of a salt prepared from 1 mol of 2,4-tolylene diamine and 1 mol of maleic acid. The mixture is gelled after 3 minutes at room temperature and hardened gradually. After kept standing at room temperature, the product shows the following properties, hardness (Shore A): 60, tensile strength: 70 kg./cm.$^2$ and elongation: 300%.

EXAMPLE 13

With 100 weight parts of prepolymer prepared in the same manner as in Example 1 is admixed at room temperature 10.9 weight parts of a salt prepared from 1 mol of 2,4-tolylene diamine and 1 mol of maleic acid. The mixture begins to harden with foaming after 3 minutes and is further kept standing at room temperature for 6 days to give the product having the following properties; density: 0.5, tensile strength: 20 kg./cm.$^2$ and elongation: 180%.

EXAMPLE 14

With 100 weight parts of prepolymer prepared in the same manner as in Example 1 is admixed 8.3 weight parts of a salt prepared from 2 mol of 2,4-tolylene diamine and 1 mol of maleic acid at 35° C. The mixture gelled after 2 minutes and begins to harden. After kept standing at room temperature, the product shows the following properties; hardness (Shore A): 65, tensile strength: 17 kg./cm.$^2$ and elongation: 220%.

Having thus disclosed the invention, what is claimed is:
1. Di-lactate of 4,4'-methylene-bis-(2-chloroaniline).

References Cited

UNITED STATES PATENTS

| 3,158,586 | 11/1964 | Krause | 260—77.5 |
| 2,200,184 | 5/1940 | Morgan | 260—501.2 |
| 2,130,947 | 9/1938 | Carothers | 260—501.2 |

FOREIGN PATENTS 806,195  1958  Great Britain.

OTHER REFERENCES

Sampson et al.: Rubber Age, vol. 89, No. 2 (May 1961), pp. 263–8.

LEON ZITVER, Primary Examiner

M. W. GLYNN, Assistant Examiner

U.S. Cl. X.R.

117—123; 260—77.5